March 21, 1933.  J. H. GROW  1,902,637
APPARATUS FOR TREATING OBJECTS
Filed Jan. 25, 1930   5 Sheets-Sheet 1

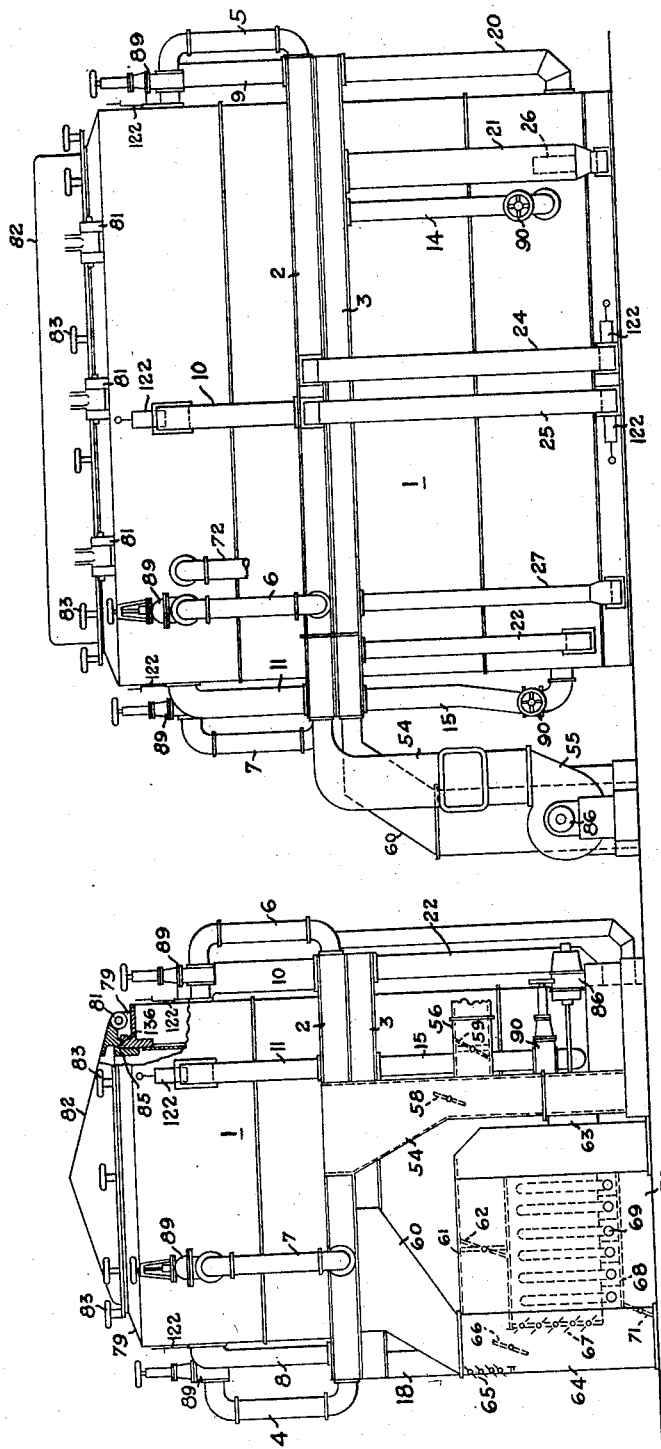

March 21, 1933.  J. H. GROW  1,902,637
APPARATUS FOR TREATING OBJECTS
Filed Jan. 25, 1930   5 Sheets-Sheet 3
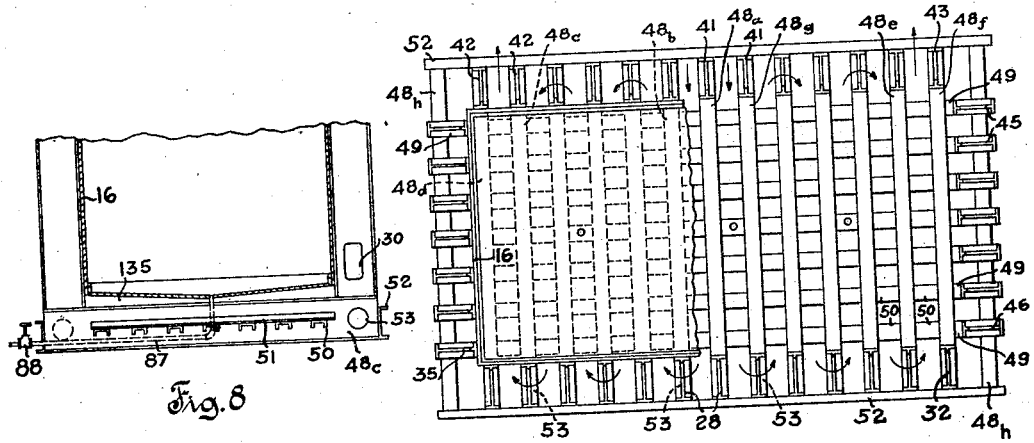
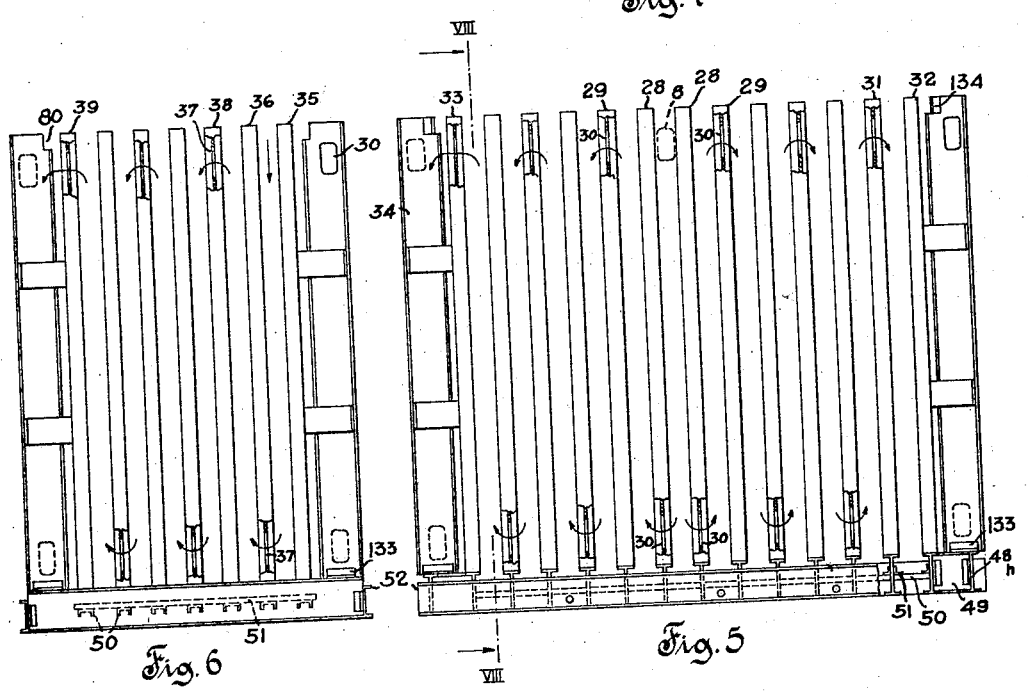
Inventor
J. H. Grow
by
Attorney

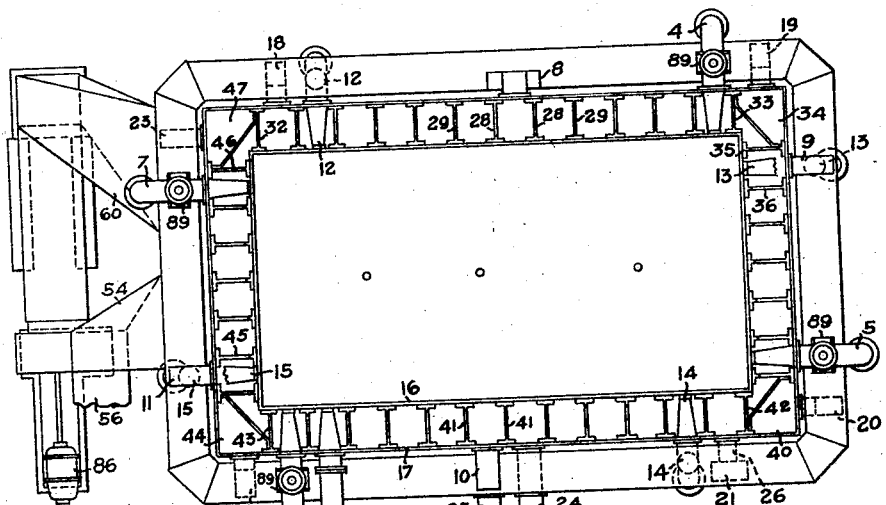
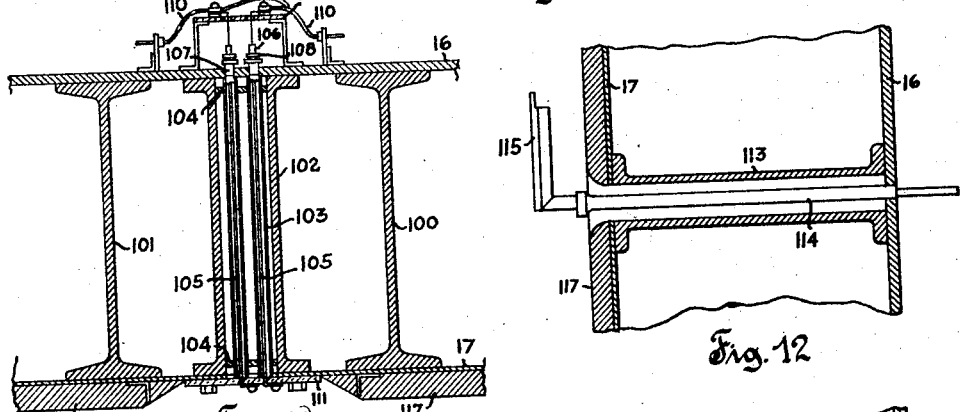
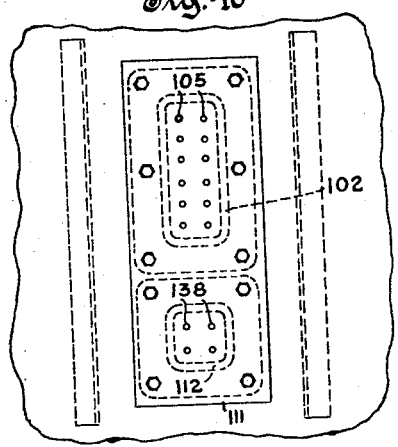

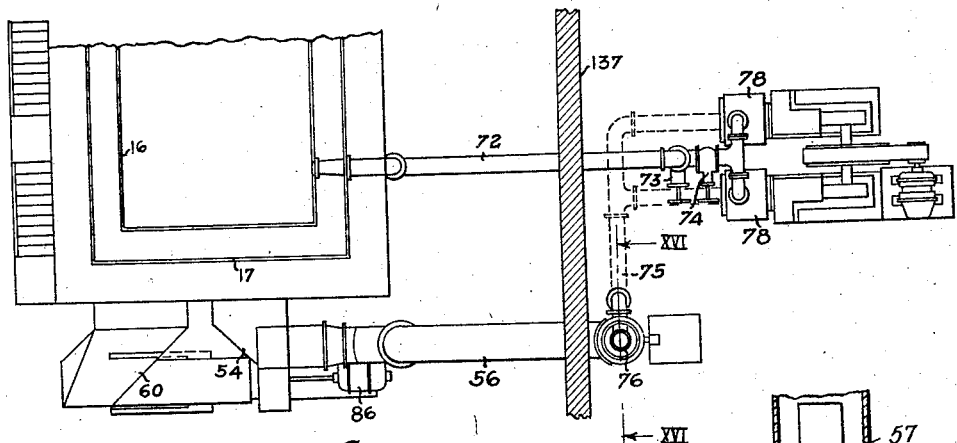
Fig. 15
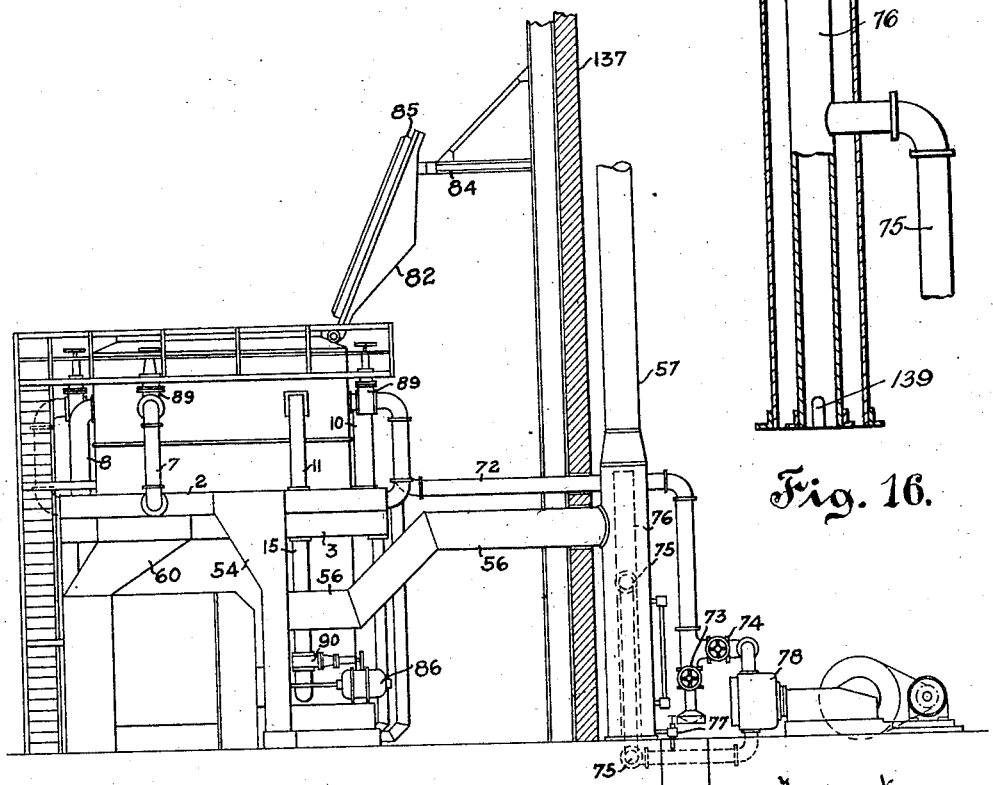
Fig. 16.
Fig. 14

Patented Mar. 21, 1933

1,902,637

UNITED STATES PATENT OFFICE

JOHN H. GROW, OF MILWAUKEE, WISCONSIN, ASSIGNOR TO ALLIS-CHALMERS MANUFACTURING COMPANY, OF MILWAUKEE, WISCONSIN, A CORPORATION OF DELAWARE

APPARATUS FOR TREATING OBJECTS

Application filed January 25, 1930. Serial No. 423,530.

This invention relates to apparatus for treating objects, and in particular for drying, heating or impregnating objects, or any one or more of these steps. The term "objects" as relating to objects to be treated is used to designate materials, apparatus, etc., in general anything that it is desired to treat. A few examples of objects which may be treated are as follows: transformers, dynamo-electric machinery and other electrical apparatus and parts thereof, asbestos, felt, cotton, lumber, wood products, chemicals, rubber, skein yarns, bar soap, etc.

One of the objects of the invention is to provide an apparatus for expeditiously and efficiently treating, and in particular drying objects. Another object is the provision of drying apparatus involving the use of both heat and vacuum. A more specific object is the provision of a container capable of withstanding a vacuum; and provided with means whereby the container may be efficiently heated. A further object is the provision of means for regulating and controlling the supply of heat to the container.

A further more specific object is the provision of means for measuring predetermined effects within the container.

A still further object is the provision of means for exhausting air and gases from the container; and of the provision of means for disposing of such air and gases, including condensates of such gases.

Still another object is the provision of a tank having a jacket, in which the strengthening means for the tank is utilized for the distribution of a heating medium between the tank and jacket. Other objects will appear hereinafter as the description of the invention proceeds.

The novel features of the invention will appear from this specification and the accompanying drawings forming a part thereof and showing one embodiment of said invention, and all these novel features are intended to be pointed out in the claims.

In the drawings:

Fig. 3 is an elevation of the other side of the apparatus shown in Fig. 1;

Fig. 4 is an elevation of the left hand end, as viewed in Fig. 3, of the apparatus shown in Fig. 3;

Fig. 5 is a fragmentary side elevation of that side of the container as viewed in Fig. 1, stripped of auxiliary apparatus and the jacket of the container;

Fig. 6 is an elevation of the left hand end, as viewed in Fig. 5, of the construction shown in Fig. 5;

Fig. 7 is a top view of the construction shown in Fig. 5;

Fig. 8 is a fragmentary sectional view of the construction shown in Fig. 5 taken on the line VIII—VIII, looking in the direction of the arrows;

Fig. 9 is a top view of the apparatus shown in Fig. 3, with certain parts removed;

Fig. 10 is a fragmentary horizontal sectional view of a detail, and Fig. 11 is an elevation of the detail shown in Fig. 10;

Figs. 12 and 13 are sectional elevations of details;

Fig. 14 is an end elevation of a complete apparatus embodying the invention, a portion of this figure being similar to Fig. 4;

Fig. 15 is a fragmentary top view of the apparatus shown in Fig. 14; and

Fig. 16 is a fragmentary side elevation of a detail partly in section taken on the line XVI—XVI of Fig. 15, looking in the direction of the arrows.

Figure 1:
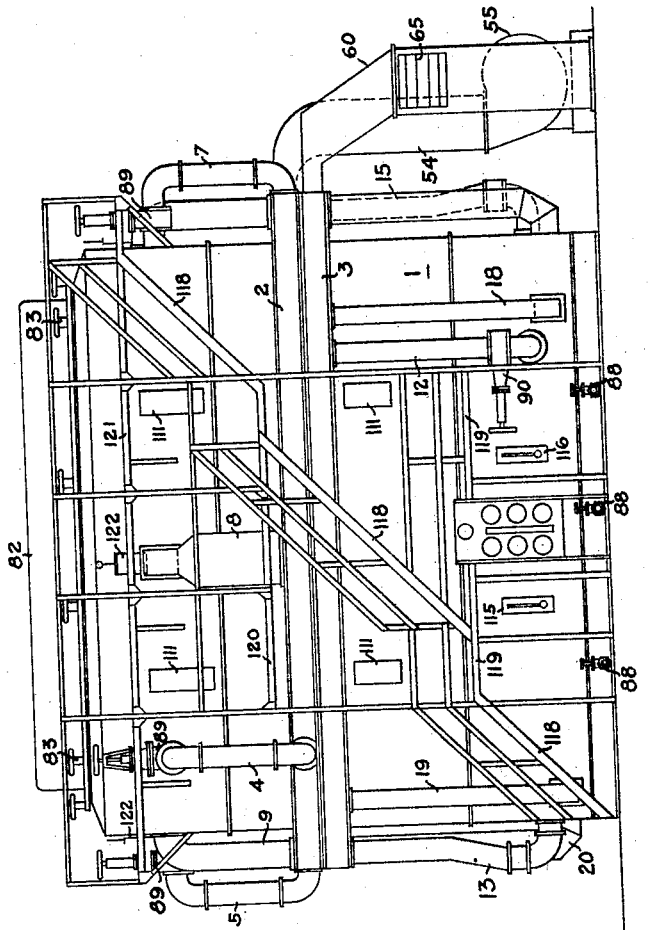
Fig. 1 is a side elevation of apparatus including a container and auxiliary apparatus embodying features of the invention.
Figure 2:
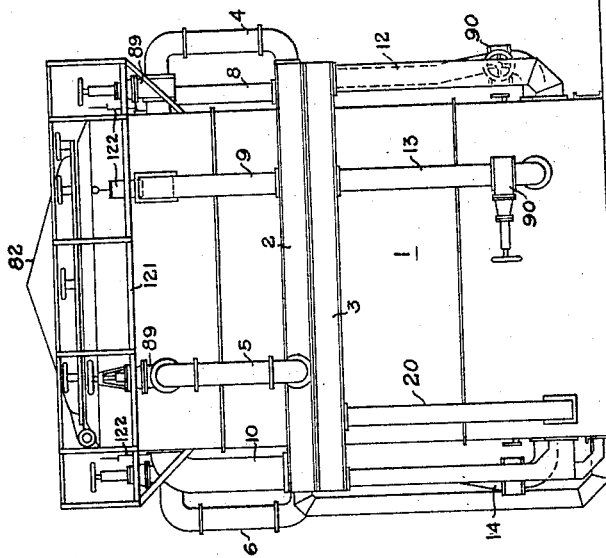
Fig. 2 is an elevation of the left hand end, as viewed in Fig. 1, of the apparatus shown in Fig. 1.

Referring to Figs. 1 to 4 of the drawings, the apparatus here shown includes a container designated in general by the reference numeral 1. The container is here shown as surrounded by an inlet header 2 and an exhaust header 3. The inlet header 2 is shown as having connected thereto inlet pipes or conduits 4, 5, 6, 7, of round section. The pipes 4, 5, 6, 7 are connectible, through valves 89, to the inside of a tank 16, forming part of the container 1, as clearly appears from Fig. 9. It will be noted that the outlet of each of said inlet pipes is situated near a corner of the tank 16, and preferably near the top thereof, each outlet being adapted to direct a stream of air alongside one wall of the tank 16.

The inlet header 2 also has connected thereto four conduits 8, 9, 10, 11, here shown as of rectangular section which are connected to feed air for heating the respective walls of the tank 16, the air being fed in the illustrated embodiment between the tank 16 and a jacket 17 surrounding the tank on all its sides and the bottom thereof, as will appear more fully hereinafter.

The outlet header 3 has connected thereto four pipes 12, 13, 14, 15, here shown as of round section, these pipes being connectible to the inside of the tank 16 through valves 90, at the respective sides of the tank, and preferably near the bottom thereof, as also appears from Fig. 9.

Connected to the outlet header 3 are conduits 18 to 23 inclusive, here shown as of rectangular section, the conduits 18, 19 serving as outlets for air blown in through conduit 8; conduits 21 and 22 serving as outlets for air blown in through conduit 10; and conduits 20 and 23 serving as outlets for air blown in through conduits 9 and 11 respectively.

The inlet header also has connected thereto a pair of conduits 24, 25 which serve to heat the bottom of the tank 16. The outlets for air blown in through conduits 24, 25 are a pair of conduits 26, 27 respectively, which are connected to the outlet header 3. It may be noted that the conduit 26 is short as here shown being connected to the outlet header 3 through connection to the conduit 21.

The passage of air through the inlet conduits 8, 9, 10, 11, 24 and 25 may be controlled by valves here shown as slidable dampers 122.

Referring now more particularly to Figs. 5, 6, 7 and 8, the tank 16 has fastened to each of its walls thereof a series of I-beams. Approximately near the middle of one of the side walls, for example, is a pair of I-beams 28 (see Fig. 5) having openings 30 in their webs at or near the bottom. The I-beams 29 have openings 30 in their webs at or near the upper end thereof, each succeeding set of beams as they progress from the center outwards having the openings in the web at opposite ends. The beams 31, 33 at the opposite ends are here shown as having the openings at the upper end. The I-beam 31 forms with an I-beam 32 which latter is not provided with any openings, a passage to which the lower end of the conduit 18 is connected. The I-beam 33 forms with the jacket itself and other I-beams a passage 34 (see also Fig. 9) to the lower end of which the conduit 19 is connected. The conduit 8 is connected to the passage formed between the beams 28, and it will be clear that air may be caused to pass up and down along the walls of tank 16 from the middle of the wall toward both ends thereof, as indicated by the arrows. In a similar manner air admitted through conduit 10 passes between I-beams 41 (see Fig. 9) alternately in both directions down and up, alternately in both directions from the middle, the air finally reaching, at one side, the passage between the I-beams 42, which passage is connected to the conduit 21 through the stub conduit 26. At the other side the air reaches the passage 44 between the I-beam 43 and the jacket, which passage is connected to the conduit 22.

Referring now particularly to Fig. 6, the I-beam 35 is not provided with any openings but the I-beam 36 next to it is provided with an opening 37 at or near the bottom, the next I-beam 38, being provided with an opening 37 near the top, and so on alternately, to the I-beam 39 which has an opening near the top. The I-beam 39 forms with the jacket, a passage 40 (see Fig. 9) which is connected to a conduit 20. The air flow is indicated by the arrows. The end of the tank opposite from that shown in Fig. 6 is similar to the latter end, and is provided with a pair of I-beams 45 (see Fig. 9) the passage between which is connected to the conduit 11, the air passing up and down between the beams as hereinbefore described until the passage 47 between the I-beam 46 and the jacket is reached. The passage 47 is connected to the conduit 23.

The bottom of the tank 16 is supported on a saddle 135 which rests on the bottom I-beams. The lower ends of the vertical I-beams abut against the saddle 135.

The bottom of the tank 16 is also provided with a series of I-beams, referred to in general by reference numerals 48, with a subletter for particular beams. The ends of these I-beams are connected by a pair of channels 52, respectively. It will be noted that the vertical I-beams disposed adjacent the long sides of the tank 16 (as for example beams 28, etc.) stand on the tops of the beams 48 respectively. The vertical beams may be fastened in any suitable manner to the bottom beams, as for example by angle irons 133. Sections 49 of I-beams are disposed between the beams $48_h$ at each end of the bottom, and the beams $48_d$ and $48_f$ respectively, these sections being suitably fastened to said beams, and serving to support the vertical beams fastened to the end walls of the tank 16. Between each pair of bottom beams other than $48_h$—$48_d$ and $48_h$—$48_f$, are provided channel iron braces 50 held in place by means of angle irons 51 running the length of the bottom beams respectively.

Air is adapted to be circulated into contact with the bottom of the tank 16 as follows. The passage between the I-beams $48_a$ and $48_b$ is connected to the inlet conduit 24. The beam $48_a$ is without any openings but the beam $48_b$ has an opening 53 at the end remote from the connection of conduit 24. As in the case of the side walls of the tank alternate beams have openings in their webs at opposite ends. The beam 48$_d$ is without any opening and the passage between this beam and the beam 48$_c$ is connected to the conduit 21. In like manner air may be caused to flow between the beams 48$_a$ and 48$_g$ back and forth between the remaining beams until the passage between the beams 48$_e$ and 48$_f$ is reached, this passage being connected to the conduit 27. The directions of air flow are indicated by the arrows.

The inlet header 2 is provided with a main inlet 54 which is connected to a blower 55 of any suitable form which may be driven by a motor 86. The connection between the main inlet 54 and the blower has connected thereto a conduit 56 which may be in turn connected to an exhaust stack 57 (see Fig. 14). The main inlet 54 may be controlled by means of a valve 58, and the outlet conduit 56 to the stack may be controlled by means of a valve 59.

The outlet header 3 of the container is connected to a main outlet 60 in turn connected to a conduit 61 the passage through which may be controlled by a valve 62. The conduit 61 leads to the inlet 63 of the blower 55. An inlet chamber 64 is provided which has an inlet opening to atmosphere which may be controlled by means of a valve 65 here shown as of the shutter type. The inlet chamber 64 is connected to the main outlet 60. The inlet chamber 64 has an outlet through a valve 67 here shown as of the shutter type, to a casing 68. The casing 68 has disposed therein suitable heating coils 69. The inlet to the inlet casing 64 may be controlled by means of a valve 66.

The inlet chamber 64 has another outlet, controlled by a valve 71, to a conduit 70 also connected to the inlet 63 of the blower.

Referring now to Figs. 3 and 14, the tank 16 has connected thereto a pipe 72 connectible through a valve 74 to a vacuum pump 78. The pipe 72 may also be connected to atmosphere through a valve 73. The exhaust side of the vacuum pump 78 is connected to a pipe 75 passing through the stack 57 and in turn connected to a standpipe 76 disposed within the stack. The standpipe 76 rests on the closed bottom of the stack 57 but is free to communicate at its bottom with the space at the bottom of the stack as through an opening 139 in said pipe (see Fig. 16). A drain valve 77 connected to the stack at or near its bottom is provided to drain off condensates that accumulate within the stack.

At the top of the container is provided a frame 79 having a flange extending into the notches 80 cut in the tops of the I-beams as may be clearly seen from Figs. 4 and 6. The cover 82 is hinged to the frame at 81. The cover 82 may be clamped down by means of clamping screws 83. The clamping screws are accessible from a platform 121 which runs all the way round the container (see Figs. 1 and 2). The platform may be reached by a staircase 118. The platform and staircase have been omitted from Figs. 3 and 4. When the cover is opened, as by means of a crane, it is adapted to rest against a bumper 84 provided on a building wall 137. The cover is provided with a flange 85 which extends inwardly inside of the frame 79, for the purpose of resisting inward thrust on the frame due to atmospheric pressure on the outside of the container when a vacuum is maintained in the tank.

The tank has one or more pipes 87 connected to the bottom thereof, as per Fig. 8, these pipes being provided with valves 88. The tank may be drained, or filled with impregnating fluid through the pipes 87.

Referring now to Fig. 10, this shows a horizontal section of a portion of the tank and its jacket along with one pair of bracing I-beams 100, 101. Between these I-beams and fastened to the tank 16 and jacket 17 in a suitable manner is a metallic tubular member 102. Disposed within the tubular member 102 are insulating tubes 103 of any desired number, which tubes are spaced from each other and from the member 102 by means of perforated spacers 104. Passing through the insulating tubes 103 are conductors 105 which continue through an insulating bushing 106. The bushing 106 is clamped between a nipple 107 threaded into the tank 16 and a nipple 108 threaded into the nipple 107, the bushing being suitably cemented into these nipples. The conductors 105 may pass through a connection board 109 from the terminals to which the conductors 105 are connected. The conductors 105 are preferably made of thermo-couple metals in pairs. Conductors 110 may be carried from these terminals to any point inside of the tank 16 where it is desired to measure quantities such as temperature. The conductors 105 also pass through holes in the jacket 17 to terminals mounted on a connection board 111. These terminals may be suitably connected to measuring instruments disposed in any desired place. The connection boards 111 (see Fig. 1) are accessible from the platforms 119 and 120 and conductors may be carried from the terminals on these boards in any suitable manner to instruments. The construction hereinbefore set forth enables the carrying through the jacket of effects from within the tank with minimum effect from the hot air circulating within the jacket, and also the ready renewal of the connections through the container, if necessary.

Another tubular member 112, similar to member 102, is provided and within this member are disposed conductors 138 which are supported, and pass through the jacket and tank in the same manner as already described in connection with conductors 105. The conductors 138 are in this instance used for transmitting to suitable instruments such as meggers, electrical resistance effects from the inside to the outside of the container.

Referring now to Fig. 12 this shows a vertical section of a fragment of the container, there being a tubular member 113 suitably fastened to the tank 16 and the jacket 17. Passing through the member 113 is a pipe 114 adapted to carrying a transmitting conduit for an indicating thermometer 115. The transmitting conduit extends within the tank 16, the thermometer 115 being adapted to measure the temperature of the air within the tank 16.

Referring to Fig. 13 this shows an indicating thermometer 116 having its responsive means extending within the jacket for the purpose of measuring the temperature of the air within said jacket.

The entire jacket is covered with heat insulating material 117 (see Figs. 10, 12 and 13), as are also all heat carrying conduits and pipes.

The objects to be treated are supported in the tank 16 in any suitable manner and the cover 82 is closed. As will be apparent from the foregoing description and what follows the mode of operation of the apparatus is susceptible of wide variation. One mode of operation is, after the objects have been placed in the tank 16, to close the dampers 122 and open the valves 89 and 90. Heat is then supplied to the coils 69 and the blower 55 is started. The valve 58 is opened and the valve 59 closed. The valve 66 is opened and the valve 62 closed. Heated air is now blown into the tank 16 through the pipes 4, 5, 6 and 7, the air within the tank being given a whirling motion, and, descending in the tank to the bottom, it leaves it through the pipes 12 to 15 inclusive. The air then passes through valves 66 and 67, through the heater 69, and from there again through the blower into the tank. The temperature of the air blown into the tank may be regulated and maintained constant by any suitable control of the valves 67 and 71. It will be noted that if the valve 67 is fully open and the valve 71 closed all of the air passes through the heater 69. Without decreasing the air circulation, the valve 67 may be closed to any predetermined degree and the valve 71 opened to any predetermined degree thereby causing a portion of the air to shunt the heater through conduit 70, thus regulating the temperature of the air which is blown into the tank. Furthermore, if desired the valve 65 may be opened to any predetermined degree to admit fresh air from atmosphere. If desired the valve 59 may also be opened to a predetermined extent so that a portion of the circulated air is exhausted into the stack 57. If it is desired merely to rapidly heat the objects within the tank, the valve 59 is maintained closed.

After the objects within the tank have been heated to a predetermined extent as determined by either the indicating thermometer 115 or instruments connected to the terminals on one or more of the connection boards 111, the valves 89 and 90 are closed and the dampers 122 are opened. The previously described circulation of heated air is now transferred from the tank 16 to the spaces between the tank and the jacket 17, the circulation of air taking place as has been previously described in connection with Figs. 5, 6 and 7. It will be obvious that many combinations of circulations can be produced by proper manipulation of the dampers 122 and of the other valves controlling the circulation of heated air. While the tank 16 is thus being heated from the exterior by circulation of hot air inside of its jacket, the valve 73 may be closed and the valve 74 opened, the vacuum pump 78 being started to withdraw air and gases from within the tank 16. The exhaust from the vacuum pump 78 leaves through the pipe 75 and stack 57. A vacuum of predetermined degree may be maintained in the tank 16 for any desired time and may then be broken by closure of valve 74 and opening of valve 73. After a predetermined time the valve 73 may be again closed and valve 74 opened thereby again subjecting the inside of tank 16 to a predetermined vacuum. This process may be continued until the desired results are secured. Ordinarily considerable condensate is formed by the gases which are withdrawn from the tank and this condensate collects at the bottom of the stack 57 from which it may be withdrawn through the valve 77.

After objects within the tank have been heated, there is ordinarily considerable smoke and gas within the tank 16 rendering it impossible for workmen to enter the tank, if necessary, until these gases have been removed. To depend upon removal of the gases by ordinary convection would consume too much time. Consequently, in order to accomplish such removal, the cover 82 is opened to a slight extent, the valves 65, 66 and 58 are closed and the valves 62 and 59 are open. With the blower 55 in operation this causes air to be drawn into the tank at the gap left by the partially open cover 82 downwards through the tank into and through pipes 12, 13, 14 and 15 to the exhaust header 3, from there to the outlet 60, through the conduit 61 and from there through the blower, through the conduit 56 to and out of the stack 57, thereby sweeping the tank clean of gases.

If it is desired to impregnate objects within the tank after they have been or while they are being subjected to the vacuum treatment hereinbefore described, the cover is maintained closed and the impregnating fluid is introduced through the pipes 87.

It should be understood that it is not desired to limit the invention to the exact details of construction shown and described, for obvious modifications may occur to persons skilled in the art.

It is claimed and desired to secure by Letters Patent:

1. In combination, a tank, a jacket spaced from said tank, partitions dividing the space between said tank and said jacket into a plurality of intercommunicated chambers, an inlet header surrounding said jacket and conduits connecting said header with certain of said chambers respectively.

2. In combination, a tank, a jacket spaced from said tank, conduits in communication with the inside of said tank and the space between said tank and said jacket, imperforate partitions dividing said space into a plurality of chambers, and perforated partitions sub-dividing said chambers into tortuously intercommunicated sub-chambers.

3. In combination, a tank, a jacket spaced from said tank, an inlet header extending horizontally and completely around said jacket, upwardly extending inlet conduits connecting said header with the inside of said jacket, an exhaust header extending horizontally and completely around said jacket and disposed adjacent to said inlet header, and downwardly extending exhaust conduits connecting said exhaust header with the inside of said jacket.

4. In combination, a rectangular tank, a jacket spaced from said tank, an inlet header surrounding said jacket, imperforate partitions arranged near the corners of said tank for dividing the space between said tank and said jacket into a plurality of chambers, and means including a conduit leading from said inlet header respectively to each of said chambers for supplying fluid to said chambers.

5. In combination, a tank, a jacket spaced from said tank, I-beams fastened to and disposed between said tank and jacket with their webs extending transversely of the space between said tank and jacket, predetermined beams having openings through their webs in opposite ends thereof.

6. In combination, a tank, a jacket spaced from the bottom and sides of said tank, I-beams fastened to and disposed between said tank and jacket with their webs extending transversely of the space between said tank and jacket, a cover for said tank having flanges extending inwardly into said tank whereby inward thrust on said jacket and tank will be resisted by said cover.

7. In combination, a tank, a jacket spaced from said tank, inlet and exhaust conduits, means for selectively connecting said inlet conduit to the inside of said tank and to the space between said tank and jacket respectively, means for selectively connecting said exhaust conduit to the inside of said tank and to the space between said tank and jacket respectively, a blower, means for connecting the exhaust side of said blower to said inlet conduit, means for connecting the inlet side of said blower to said exhaust conduit, and means for admitting air from atmosphere to said last named connecting means.

8. In combination, a tank, a jacket spaced from said tank, inlet and exhaust conduits, means for selectively connecting said inlet conduit to the inside of said tank and to the space between said tank and jacket respectively, means for selectively connecting said exhaust conduit to the inside of said tank and to the space between said tank and jacket respectively, a blower, means for connecting the exhaust side of said blower to said inlet conduit, means for connecting the inlet side of said blower to said exhaust conduit, means for admitting air from atmosphere to said last named connecting means, a conduit in shunt with said last named connecting means, and heating means in said shunt conduit.

9. In combination, a tank, a jacket spaced from said tank, means for dividing the space between said tank and said jacket into a plurality of chambers, inlet and exhaust conduits, means for selectively connecting said inlet conduit to the inside of said tank and to said chambers, means for selectively connecting said exhaust conduit to the inside of said tank and to said chambers, a blower, means for connecting the exhaust side of said blower to said inlet conduit, means for connecting the inlet side of said blower to said exhaust conduit, means for admitting air from atmosphere to said last named connecting means, a conduit in shunt with said last named connecting means, heating means in said shunt conduit, a second conduit in shunt with said first shunt conduit, and a valve in said second conduit.

10. In combination, a tank, a jacket spaced from said tank, inlet and exhaust conduits in communication with the space between said tank and said jacket, a main casing connected at one end thereof to said exhaust conduit, a fluid circulating blower interposed between the other end of said casing and said inlet conduit, an auxiliary casing so arranged within said main casing as to define three flow paths through said main casing, a heater in said auxiliary casing, and valve means for selectively causing said fluid to flow through one or more of said flow paths.

11. In combination, a tank, inlet and exhaust conduits connected to said tank, a casing connected at one end thereof to said exhaust conduit, a blower interposed between the other end of said casing and said inlet conduit for circulating fluid through said tank, a heater device within said casing, said device having an inlet opening and an outlet opening, a conduit connected in shunt with said inlet and outlet openings for by-passing a portion of said fluid, a second conduit connected in shunt with said inlet and outlet openings for by-passing all of said fluid, a valve in each by-pass conduit, a valve in said inlet opening, a stack, means including a valve for connecting said stack to said inlet conduit, and a valve in said inlet conduit between said means and said tank.

12. In combination, a casing having inlet and outlet ends, a valve controlling said inlet, a heater in said casing, an inlet chamber having an outlet to the inlet of said casing, a second outlet for said chamber, a continuous conduit between said second outlet and the outlet of said casing, a valve in said conduit, a valve for the inlet of said chamber, a second conduit between the inlet end of said chamber and the outlet of said casing, and a valve in said second conduit.

13. In combination, a tank having a cover, inlet and exhaust conduits for said tank, an exhaust stack, a conduit connecting said stack to said inlet conduit, a valve in said stack connecting conduit, a valve in said inlet conduit between said stack connecting conduit and said tank, and means including a blower for causing air from the atmosphere to pass through said tank, said exhaust conduit, said blower, and out said stack when said cover and said valve in said stack connecting conduit are open and said valve in said inlet conduit is closed.

14. In combination, a tank, a vacuum pump having its suction side connectible to said tank, a stack, means for closing the bottom of said stack, a standpipe disposed in said stack said pipe being free to communicate with the space within said stack at the top and bottom of said pipe, a conduit connecting the exhaust side of said pump with said standpipe intermediate its ends, and means for draining the bottom of said stack.

15. In combination, a tank, an exhaust stack, a blower having its intake side connected to said tank and its outlet side to said stack, a vacuum pump having its suction side connected to said tank, and a conduit connected to the exhaust side of said pump and extending into said stack to a point above the point of connection of said blower to said stack.

16. In combination, a tank, a jacket spaced from said tank, tubular means disposed between and fastened to said jacket and tank, a tube disposed within said tubular means, an opening in said tank communicating with the inside of said tubular means, a nipple threaded in said opening, a second nipple threaded into said first nipple, an insulator disposed in said second nipple, and electrical conducting means passing through said insulator, tank-opening, tube and jacket.

In testimony whereof, the signature of the inventor is affixed hereto.

JOHN H. GROW.